Patented June 9, 1942

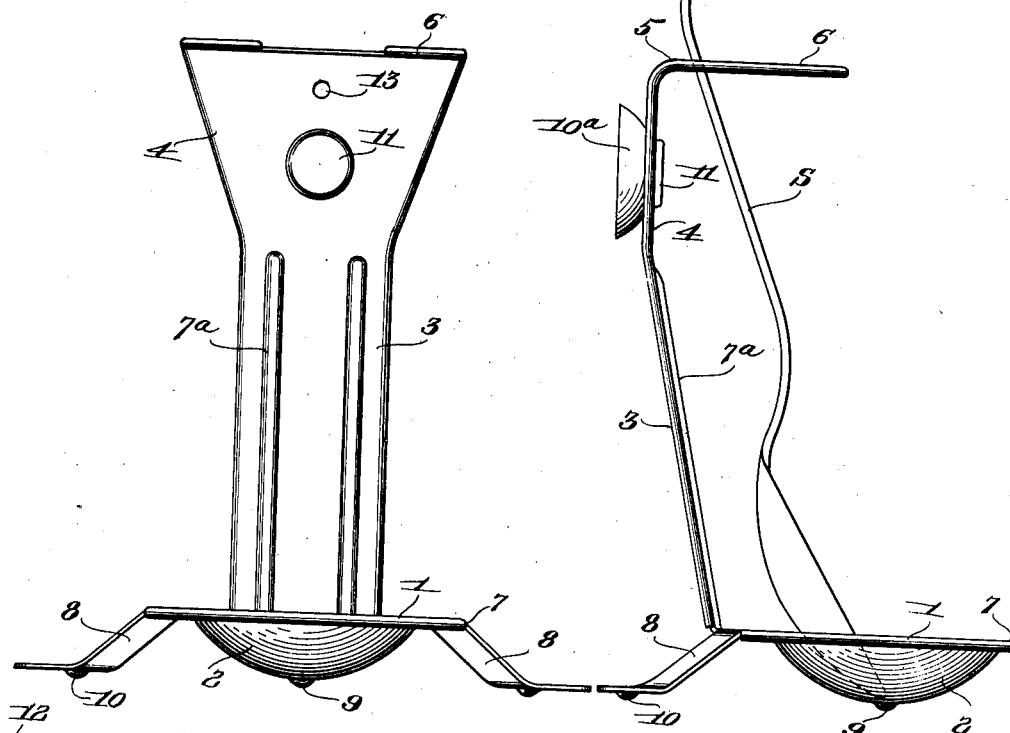
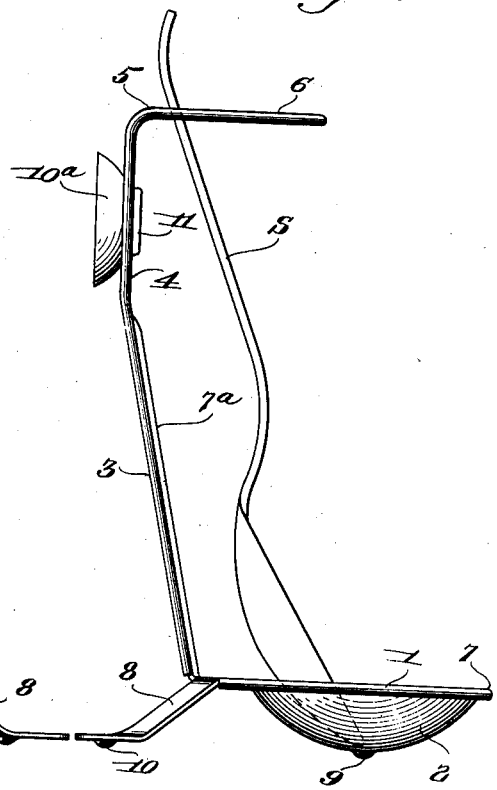
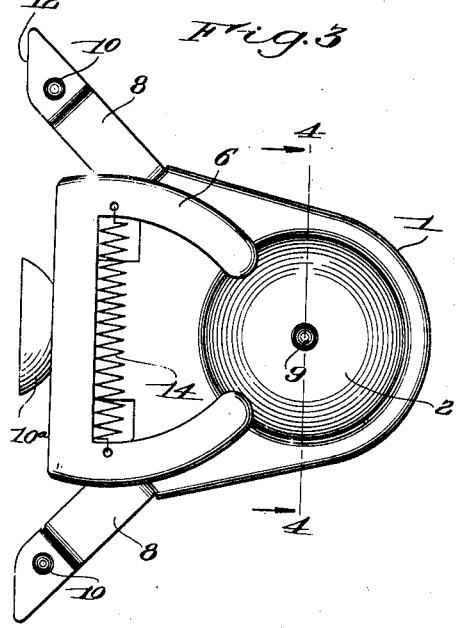
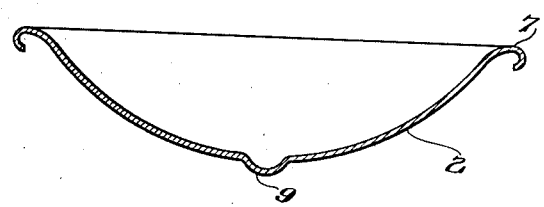

2,286,012

UNITED STATES PATENT OFFICE 2,286,012

IMPLEMENT HOLDER

Arthur J. Rochow, Pittsford, N. Y.

Application October 9, 1940, Serial No. 360,466

2 Claims. (Cl. 65—65)

My present invention relates to stands and racks and it has for its object to provide a simple and convenient device of this character that can be produced inexpensively and will be useful in the kitchen and similar environments for holding culinary implements such as spoons or forks during their use in stirring and manipulating food preparations.

In such instances, a food or batter spoon that has been dipped in the vessel or dish and must remain handy to be similarly used again of course drains itself wherever laid leaving spots or pools. In the practice of my present invention, I provide a compact and stable holder that may be either attached to a nearby upright surface or can be stood on the stove or table. It furnishes a basin or drip pan at the bottom and retaining means at the top so that the handle of the implement is engaged and an erect position of the implement maintained.

An object of the invention is to achieve the manufacture of such an article as far as possible from a single sheet metal stamping, and to these and other ends, the invention resides in certain improvements and combination of parts, all as will be hereinafter more fully described, the novel features being pointed out in the claims at the end of this specification.

In the drawing:

Figure 1 is a front elevation of an implement holder constructed in accordance with and illustrating one embodiment of my invention;

Figure 2 is a side view thereof;

Figure 3 is a top view slightly modified, and

Figure 4 is a vertical section through the drip basin taken substantially on the line 4—4 of Figure 3.

Similar reference numerals throughout the several views indicate the same parts.

Referring more particularly to the drawing, 1 indicates a tray-like base having a substantially central depressed basin 2 stamped downwardly therein. Proceeding upwardly from the rear edge of the tray portion and at a slight inclination is a standard portion 3 that merges into a vertical back portion 4. The stamping thence proceeds horizontally forwardly at 5 to terminate in a pair of inwardly curved retaining arms 6. The upper ends of these latter may be separated to a greater or less degree suitably proportioning security to convenience in inserting the implement therebetween, it being indicated in Figure 2 how a spoon is supported with the bowl in the basin 2 and the handle between the arms 6. By the construction described and particularly with reference to the inclined standard 3, the arms are offset rearwardly of the basin so that the spoon inclines in that direction for security in its position.

The margins of the tray 1 are flanged downwardly and inwardly in a curve that provides a half bead 7 that greatly strengthens the stamping even though made of light gauge aluminum for instance. This bead at one point constitutes a reverse curve in continuation of the depression 2 of the basin as shown in the section. Also, for strengthening purposes, a ridge 7a may be formed in the standard 3.

The bead is continued along the edges of the standard 3, the back 4 and the arm portions 5 and 6 for the same purpose. It is interrupted, however, at the junctions of the standard 3 with the tray by rearwardly divergent supporting legs 8 that hold the tray and basin level when the device is placed on a horizontal surface. A stable three-point contact is made by further stamping out a protuberance 9 on the under side of the basin and protuberances 10 on the base portions of the legs 8.

As before stated, it is, however, sometimes desired to attach the holder to a wall, stove back or similar vertical support, and I also make provision for this. Fastened to the back portion 4 to project rearwardly therefrom is a rubber vacuum cup 10. This may be secured by perforating the metal and thrusting therethrough a shouldered head or button 11 on the cup that interlocks at the front. As appears in Figure 2, the rim of the cup is in a plane with the rear ends of the legs 8 which are cut angularly at 12 to make flat contact in said plane, namely, with a supporting wall. It will thus be seen that when the suction cup is pressed against the wall surface in the usual manner the legs will still cause the holder to be maintained erect as before and the spoon or implement can be inserted and removed with the same convenience and celerity.

If the wall surface is of a nature that does not lend itself to cooperation with the vacuum cup, the holder can be suspended from a nail for which purpose an aperture 13 in the back 4 above the vacuum cup is provided, or both may be used together in case the vacuum cup should let go in which case the latter would still act as a steadying frictional contact.

In Figure 3, only, I have shown an added feature consisting of a coil spring 14 stretched between the bases of the arms 6 at the rear thereof. The convolutions of this spring being held open by the tension, the handles of implements of some varieties may be wedged between for additional security.

The device of my invention is useful not only for culinary purposes but may be used in the laboratory for test tubes and the like, or in any instance where a dripping utensil must be temporarily put aside.

I claim as my invention:

1. An implement holder of the character described, fashioned from a single sheet metal stamping and embodying in combination a horizontally disposed drip basin, a relatively narrow standard extending upwardly therefrom at the rear thereof, and a forward extension above the standard provided with inwardly turned arms reaching toward each other above the basin for retention of the handle of an implement resting in the latter, there being legs extending rearwardly downwardly from the rear of the basin adapted to support the holder upright on a horizontal surface jointly with the bottom of the basin and to also engage a vertical wall and maintain the holder upright when the standard is hung against such wall.

2. An implement holder of the character described, embodying in combination a horizontally disposed drip basin, a rearwardly inclined standard extending upwardly therefrom at the rear thereof, a substantially vertical back piece extended obliquely upwardly from the standard, a forward extension on the back piece provided with inwardly turned arms reaching toward each other above the basin for retention of the handle of an implement resting in the latter, means near the top of the back piece for supporting the holder on a vertical wall and rearwardly and downwardly extending legs on the basin adapted to maintain the holder upright on a horizontal surface jointly with the bottom of the basin and to also engage the vertical wall and maintain the holder upright when the same is so supported thereon.

ARTHUR J. ROCHOW.